United States Patent [19]
Kish et al.

[11] Patent Number: 5,813,292
[45] Date of Patent: Sep. 29, 1998

[54] METHOD FOR FABRICATING A SPLIT PATH TRANSMISSION SYSTEM PROVIDING EQUAL TORQUE SPLITTING BETWEEN THE SPLIT LOAD PATHS OF EACH GEAR TRAIN THEREOF AT A PREDEFINED OPERATING POINT

[75] Inventors: Jules G. Kish, Milford; Robert J. Durwin, Trumbull; Timothy L. Krantz, North Olmsted, all of Conn.

[73] Assignee: Sikorsky Aircraft Corporation, Stratford, Conn.

[21] Appl. No.: 573,161

[22] Filed: Dec. 15, 1995

[51] Int. Cl.$^6$ .................................................. F16H 3/095
[52] U.S. Cl. ......................... 74/665 C; 74/664; 74/392; 74/410; 244/60; 244/17.19
[58] Field of Search .............................. 74/392, 395, 410, 74/661, 664, 665 R, 665 A, 665 B, 665 C; 244/17.19, 17.21, 17.11, 60; 416/170 R

[56] References Cited

U.S. PATENT DOCUMENTS

| | | | |
|---|---|---|---|
| 4,229,991 | 10/1980 | Douglas et al. | 74/410 X |
| 4,479,619 | 10/1984 | Saunders et al. | 244/17.11 X |
| 5,113,713 | 5/1992 | Isabelle et al. | 74/410 X |
| 5,135,442 | 8/1992 | Bossler, Jr. | 74/665 B |

*Primary Examiner*—Charles A. Marmor
*Assistant Examiner*—Nathan O. Jensen
*Attorney, Agent, or Firm*—Terrance J. Radke

[57] ABSTRACT

A method for fabricating a split path transmission system that achieves equal torque splitting between the forward and aft split load paths of each gear train thereof at a predefined operating point by providing an intentional timing difference between gears and pinions of the forward and aft split load paths of each gear train of the split path transmission system is disclosed. The method includes the steps of identifying the torque distribution curves of the forward and aft split load paths of one gear train of the split path transmission system. The method further includes a step of selecting a predefined operating point for the split path transmission system wherein equal torque splitting between the forward and aft split load paths of the one gear train is desired. Next, the forward and aft torque distribution curves are analytically modified as required to pass through the predefined operating point. The interception point with the abscissa of the analytically-modified forward or aft torque distribution curve having the steeper slope is then identified to quantify an input torque range. Finally, the timing relationship of the gears and pinions of the split load path represented by the analytically-modified torque distribution curve having the steeper slope is altered to provide an intentional timing difference between the gears and pinions of the forward and aft split load paths, respectively, of the one gear train such that during operation of the split path transmission system the other split load path transmits all torque input to the main rotor shaft over the input torque range.

5 Claims, 5 Drawing Sheets

5,813,292

METHOD FOR FABRICATING A SPLIT PATH TRANSMISSION SYSTEM PROVIDING EQUAL TORQUE SPLITTING BETWEEN THE SPLIT LOAD PATHS OF EACH GEAR TRAIN THEREOF AT A PREDEFINED OPERATING POINT

The U.S. Government has rights in this invention pursuant to Contract No. DAAJ09-91-C-A004 awarded by the Department of the Army.

TECHNICAL FIELD

The present invention relates to transmission systems, and more particularly, to a method for fabricating a split path transmission system, particularly a split path transmission system for a helicopter, that provides equal torque splitting in the split load paths of each engine gear train or branch at a predefined operating point and the split path transmission system fabricated thereby.

BACKGROUND OF THE INVENTION

A transmission system comprises one or more independent gear trains or branches composed of intermeshing gears and is operative to couple the power (torque) developed by a powerplant system to an output member. In those applications where the powerplant system comprises two or more engines, the transmission system includes an independent gear train or branch for coupling the torque developed by each engine to the output member, e.g., the transmission system for a two-engine powerplant system would comprise two independent gear trains or branches. In such transmission systems, and in particular, helicopter transmission systems, it may be desirable to split the power output from each engine of the powerplant system so that each associated gear train or branch includes redundant, i.e., split, load paths for coupling the power from the corresponding engine to a common output member, e.g., the main rotor shaft of a helicopter. Such split path transmission system configurations reduce the tooth loading of the intermeshing gears, i.e., gear train assemblies, comprising each redundant load path and result in lighter weight gear train assemblies. In addition, split path transmission systems are inherently more reliable from the perspective that if one gear assembly, i.e., load path, becomes inoperative, the total torque from the respective engine will be transmitted through the remaining gear assembly, i.e., the redundant load path, thereby ensuring short-term emergency operation of the transmission system.

A schematic illustration of an exemplary embodiment of a split path transmission system for helicopters is illustrated in FIG. 1. Large helicopters typically have a powerplant system composed of two or three gas turbine engines, depending upon the gross weight, size, and power and redundancy requirements of the helicopter. FIG. 1 illustrates the configuration of a split path transmission system 100 for a powerplant system composed of two engines (conventionally identified as the left and right engines from an aft looking-forward perspective). The split path transmission system 100 utilizes independent gear trains or branches to transmit the power developed by the left and right engines (not shown) to the main rotor shaft 102 of the main rotor assembly which is operative to provide the motive power for the helicopter. The split path transmission system 100 utilizes reduction gearing assemblies to convert engine power at high RPMs (i.e., low torque) to high torque at low RPMs for rotation of the helicopter main and tail rotor blades.

Each gear train or branch of illustrated embodiment of the split path transmission system 100 utilizes three stages of reduction gearing assemblies to reduce the RPM of each engine output, e.g., for the illustrated embodiment an engine input to the transmission system 100 of about 23,000 RPM, to the design output of the main rotor shaft 102, e.g., about 355 RPM for the described embodiment. Each engine (not shown) provides an output to the respective branch of the split path transmission system 100 via an engine output shaft (the respective engine output shafts are identified by reference characters 104L and 104R) that is normally coupled through a spring overrunning clutch (not shown for purposes of simplification) to the associated gear train or branch 106L/106R. Each branch 106L/106R is operative to provide torque transmission and splitting as described in the following paragraphs. A central bull gear 108 recombines the split power coupled through each branch 106L/106R to effect rotation of the main rotor shaft 102 (the main rotor shaft 102 is mechanically integrated in combination with the central bull gear 108 so that the main rotor shaft 102 rotates at the same speed as the central bull gear 108).

The first reduction stage of each branch 106L/106R illustrated in FIG. 1 is a bevel gear set that comprises a bevel pinion 110L/110R and a bevel gear 112L/112R (note that bevel gear 112R is obscured in FIG. 1) in intermeshing combination. Each bevel pinion 110L/110R, bevel gear 112L/112R combination of the described embodiment provides a reduction ratio of about 2.03/1 (from about 23,000 RPM to about 11,317 RPM) for the respective branch 106L/106R. The shaft angles of the bevel gears 112L/112R are positioned so that the centerlines thereof are parallel to the centerline of the main rotor shaft 102.

The second stage of each branch 106L/106R is a simple spur gear set or a high contact ratio spur gear set that comprises a spur pinion 114L/114R (note that spur pinion 114R is obscured in FIG. 1) and a pair of spur gears $116L_{Fwd}$, $116L_{Aft}$/$116R_{Fwd}$, $116R_{Aft}$ (note that spur gear $116R_{Fwd}$ is partially obscured in FIG. 1) in intermeshing combination (the "forward" and "aft" descriptors are based upon an aft looking-forward perspective). Each spur pinion 114L/114R, spur gears $116L_{Fwd}$, $116L_{Aft}$/$116R_{Fwd}$, $116R_{Aft}$ combination of the described embodiment provides a reduction ratio of about 2.88/1 (from about 11,317 RPM to about 3,931 RPM) for the respective branch 106L/106R.

The third or final reduction stage of each branch 106L/106R is a double helical output gear set that comprises a pair of double helical bull pinions $118L_{Fwd}$, $118L_{Aft}$/$118R_{Fwd}$, $118R_{Aft}$ that are intermeshed in combination with the central bull gear 108. Each central bull gear 108, bull pinions $118L_{Fwd}$, $118L_{Aft}$/$118R_{Fwd}$, $118R_{Aft}$ combination of the described embodiment provides a reduction ratio of about 11.07/1 (from about 3,931 RPM to about 355 RPM) for the respective branch 106L/106R. Also illustrated in FIG. 1 is a take-off bull pinion 120 that concurrently: (i) couples torque aftwardly to effect rotation of the tail rotor system (not shown) via a shaft 122; and (ii) couples torque to an oil-cooler blower unit (not shown) for providing air to an air/oil heat exchanger via a shaft 124.

The gear trains or branches 106L/106R of the split path transmission system 100 described in the preceding paragraphs function as independent means for transmitting torque from the left and right engines, respectively, to the main rotor shaft 102. The left engine torque-transmitting means is defined by the intermeshing gears and pinions comprising the left gear train or branch 106L, i.e., the left bevel pinion 110L, the left bevel gear 112L, the left spur pinion 114L, i.e., forward and aft left spur gears $116L_{Fwd}$, $116L_{Aft}$, the forward and aft left double helical bull pinions $118L_{Fwd}$, $118L_{Aft}$, and the central bull gear 108. Similarly, the right engine torque-transmitting means is defined by the intermeshing gears and pinions comprising the right gear train or branch 106R, i.e., the right bevel pinion 110R, the right bevel gear 112R, the right spur pinion 114R, the forward and aft right spur gears $116R_{Fwd}$, $116R_{Aft}$, the forward and aft right double helical bull pinions $118R_{Fwd}$, $118R_{Aft}$, and the central bull gear 108. From a gross structural perspective, the left and right gear trains or branches 106L/106R are identical, i.e., equivalent physical dimensions for the constituent gears, pinions, and shafts of each engine branch 106L/106R. Moreover, the geometrical relationship between the left and right engine branches 106L/106R with respect to a longitudinal plane through the center of rotation of the central bull gear 108 is a mirror-image relationship.

In the described embodiment of the split path transmission system 100, torque splitting is effected in the second-third stages of each branch 106L/106R such that forward and aft split load paths are defined in the left and right engine torque-transmitting branches, respectively. Torque from each engine drive gear, i.e., the spur pinion 114L/114R, is split between the pair of spur gears $116L_{Fwd}$, $116L_{Aft}$/ $116R_{Fwd}$, $116R_{Aft}$ of each gear train 106L/106R. Each spur gear $116L_{Fwd}$, $116L_{Aft}$, $116R_{Fwd}$, $116R_{Aft}$, in turn, drives the corresponding integral, coaxial double helical bull pinion $118L_{Fwd}$, $118L_{Aft}$, $118R_{Fwd}$, $118R_{Aft}$ (integral being used herein in the sense that the respective spur gears 116 and bull pinions 118 are mounted on a common compound shaft (preferably fabricated as a single piece)—see FIG. 1). The central bull gear 108 recombines the torque from the double helical bull pinions $118L_{Fwd}$, $118L_{Aft}$/$118R_{Fwd}$, $118R_{Aft}$ of each gear train 106L/106R to effect rotation of the main rotor shaft 102.

For the left engine torque-transmitting branch 106L, therefore, forward and aft split load paths are defined by the spur pinion 114L, the left forward spur gear $116L_{Fwd}$, the left forward double helical bull pinion $118L_{Fwd}$, central bull gear 108 combination and the spur pinion 114L, the left aft spur gear $116L_{Aft}$, the left aft double helical pinion $118L_{Aft}$, central bull gear 108 combination, respectively. Similarly, for the right engine torque-transmitting branch 106R, forward and aft split load paths are defined by the spur pinion 114R, the right forward spur gear $116R_{Fwd}$, the right forward double helical bull pinion $118R_{Fwd}$, central bull gear 108 combination and the spur pinion 114R, the right aft spur gear $116R_{Aft}$, the right aft double helical pinion $118R_{Aft}$, central bull gear 108 combination, respectively.

Ideally, split path transmission system configurations should be designed to ensure that torque is split in equal proportions between the forward and aft split load paths of each primary torque transmitting branch, e.g., the respective gear trains 106L/106R described hereinabove. FIG. 2 illustrates the left split load path 106L of the split path transmission system 100 described in the preceding paragraphs. Further, FIG. 2 illustrates the condition that spur pinion 114L is simultaneously in contact with both the left aft spur gear $116L_{Aft}$ and the left forward spur gear $116L_{Fwd}$ and the central bull gear 108 is simultaneously in contact with both the left aft double helical bull pinion $118L_{Aft}$ and the left forward double helical bull pinion $118L_{Fwd}$. One skilled in the art will recognize that the condition described in the preceding sentence, as illustrated in FIG. 2, is a necessary and sufficient condition to ensure that torque will be distributed in some manner between the left forward and aft split load paths.

However, one skilled in the art will also recognize that such condition does not by itself ensure that the torque will be equally distributed in the ideal manner between the left forward and aft split load paths. The torque split, i.e., load sharing, between the left forward and aft split load paths of the respective gear trains 106L/106R of a split path transmission will be a natural result of the relative flexibilities of the forward and aft split load paths and of the arc mesh path created by the simultaneously contacting pinions and gears. FIG. 2 illustrates the arc mesh path (the heavy line identified by reference characters AMP) for the left split load path transmission system 100 described in the preceding paragraphs. The length of the arc mesh path AMP is affected by the actual geometries of the elements of the system which may vary from the blueprint geometries as a result of manufacturing errors and/or tolerances. In addition, the length of the arc mesh path AMP will be affected by deflections induced in the elements of the system as a result of gear meshing, e.g., gear tooth Hertzian deflections, gear tooth bending deflections, gear rim deflections, torsion and bowing of gearshafts, bearing deflections, and by housing deflections due to loading/thermal effects. These factors, individually or in combination, can cause torque loading differentials between the forward and aft split load paths if the factors are not accommodated for properly in the design of a split path transmission system.

In an attempt to minimize torque loading differences between the split load paths of split path transmission systems, the prior art has interposed a torque adjusting device within the torque load path between the engine and the central bull gear. One prior art torque adjusting device for split path transmission systems is a quill shaft as exemplarily illustrated in FIG. 3 of U.S. Pat. No. 5,113,713. Quill shafts provide a means for minimizing the torque loading differences between the split load paths by reducing the torsional spring rates of the forward and aft split load paths, which reduces the net effects of the factors that produce torque loading differentials. While the use of quill shafts to reduce torsional spring rates is a relatively effective method, the method does not completely compensate for the factors causing the torque loading differences, but instead acts to minimize the net effect of such factors. Therefore, the quill shaft method does not guarantee, and rarely achieves, the ideal condition of an equal distribution of torque between the forward and aft split load paths. Furthermore, incorporating a quill shaft in each gear train assembly increases the overall complexity and weight of the split path transmission system. This, in turn, increases the costs and time required for initial assemblage and subsequent maintenance of the transmission system. In addition, incorporation of quill shafts into the transmission system reduces the reliability of the system such that inspection and maintenance is required on a more frequent basis.

A need exists to provide a split path transmission system that is operative to provide substantially equal torque distribution between the forward and aft split load paths of each gear train assembly. Such a split path transmission system should achieve equal torque distribution without incorporating additional components that would increase the overall complexity or weight of the split path transmission system.

DISCLOSURE OF THE INVENTION

One object of the present invention is to provide a method for fabricating a split path transmission system wherein equal torque splitting is provided between the forward and aft split load paths of each engine gear train of the split path transmission system at a predefined operating point.

Another object of the present invention is to provide a method for fabricating a split path transmission system having equal torque splitting between the forward and aft split load paths of each engine gear train at a predefined operating point by providing an intentional timing difference in the forward and aft split load paths of each engine gear train.

These and other objects of the present invention are achieved by a method for fabricating a split path transmission system that achieves equal torque splitting between the forward and aft split load paths of each gear train of the split path transmission system at a predefined operating point by providing an intentional timing difference between gears and pinions of the forward and aft split load paths of each gear train of the split path transmission system. The method includes the steps of identifying the torque distribution curves of the forward and aft split load paths of one gear train of the split path transmission system and of depicting the identified forward and aft torque distribution curves in a graphical format wherein the abscissa of the graph represents the torque input $T_{in}$ coupled into the one gear train and the ordinate of the graph represents the torque transmitted through the forward and aft split load paths, respectively.

The method further includes a step of selecting a predefined operating point for the split path transmission system wherein equal torque splitting between the forward and aft split load paths of the one gear train is desired. Next, the forward and aft torque distribution curves are analytically modified as required to pass through the predefined operating point. The interception point with the abscissa of the analytically-modified forward or aft torque distribution curve having the steeper slope is then identified to quantify a compensating input torque range. Finally, the timing relationship of the gears and pinions of the split load path represented by the analytically-modified torque distribution curve having the steeper slope is altered to provide an intentional timing difference between the gears and pinions of the forward and aft split load paths, respectively, of the one gear train such that during operation of the split path transmission system the other split load path transmits all torque input $T_{in}$ to the main rotor shaft over the compensating input torque range.

The foregoing steps are repeated for each remaining gear train of the split path transmission system to provide an intentional timing difference between the gears and pinions of the forward and aft split load paths, respectively, of each remaining gear train such that equal torque splitting in the forward and aft split load paths of each remaining gear train is achieved at the predefined operating point.

BRIEF DESCRIPTION OF THE DRAWINGS

A more complete understanding of the present invention and the attendant features and advantages thereof may be had by reference to the following detailed description when considered in conjunction with the accompanying drawings wherein.

BEST MODES FOR CARRYING OUT THE INVENTION

A method for fabricating a split path transmission system that provides equal torque splitting between the split load paths of each engine gear train or branch at a predefined operating point, i.e., design point, and the split path transmission system fabricated by such method is described herein in terms of the helicopter split path transmission system 100 described in the "Background of the Invention" hereinabove. Such a split path transmission system 100 is similar to the transmission system incorporated in the RAH-66 Comanche helicopter being developed by the Sikorsky Aircraft Corporation. One skilled in the art will appreciate that the method of the present invention has utility in fabricating split path transmission systems for helicopters having other powerplant system configurations, e.g., a powerplant system composed of one engine or three engines, as well as for applications other than helicopter transmission systems. Therefore, it is to be understood that the following description of the method according to the present invention is not intended to be limiting, but merely illustrative of the teachings of the method according to the present invention.

A prototype of the split path transmission system 100 described hereinabove was fabricated for gear pattern development tests and was subjected to empirical testing. During testing, the torque was measured in each of the forward and aft split load paths of each engine gear train or branch 106L/106R over the torque output range of the engines of a powerplant system having predefined parameters. For example, for a dual-engine powerplant system: a contingency rated power input to the transmission system from each engine of about 1,066 kilowatts (1,430 horsepower), a 100% rated power input to the transmission system from each engine of about 820 kilowatts (1,100 horsepower), and a cruise rated power input to the transmission system from each engine of about 559 kilowatts (750 horsepower) based upon a transmission input speed of about 23,000 RPM from each engine. Torque—time traces were recorded and measured during the empirical testing to ascertain discrete torque loads for the respective forward and aft split load paths of the left and right gear trains or branches 106L/106R. The discrete torque loads were plotted as points on a graph, and a straight line best fit curve was calculated for the plotted points by linear regression and then drawn on the graph to provide the respective torque distribution curves illustrated in the graphs of FIGS. 3, 4.

Figure 3:
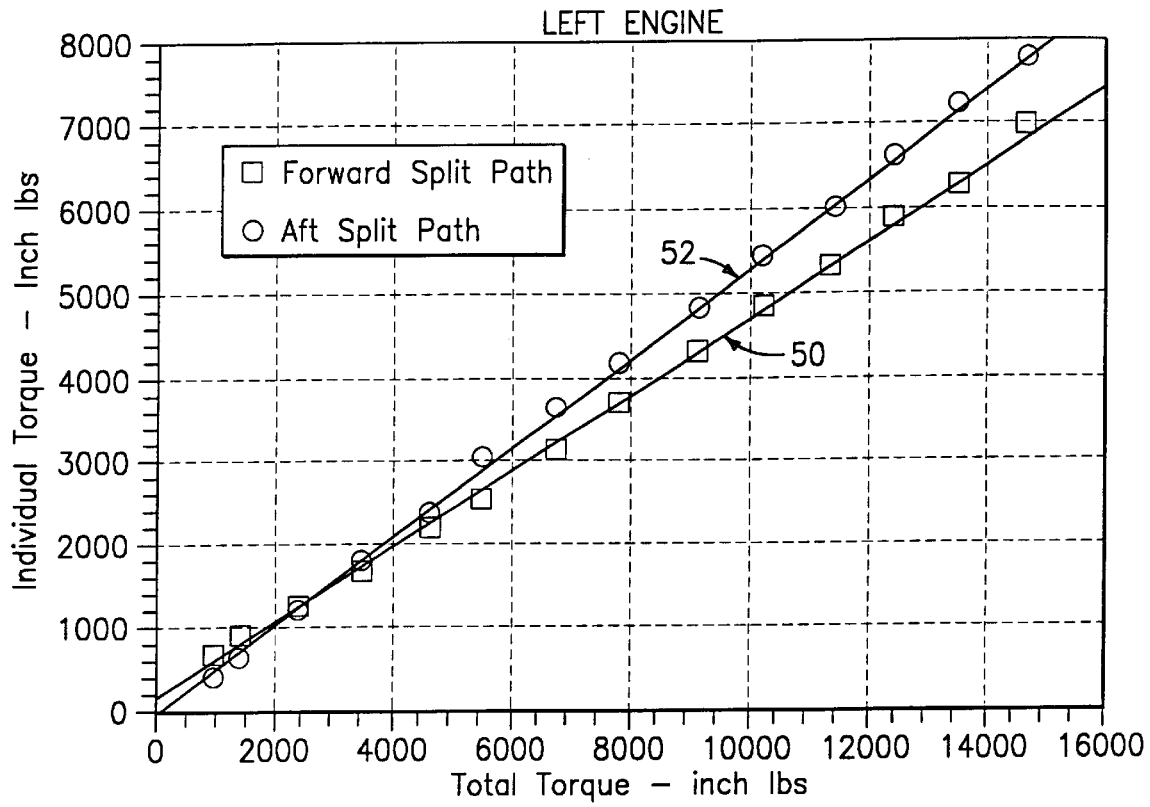
FIG. 3 is a graph illustrating the torque distribution curves for the forward and aft split load paths of the left engine gear train of the helicopter split path transmission system of FIG. 1.

FIG. 3 is a graph illustrating the individual torque distribution curves for the forward and aft split load paths of the left engine gear train 106L. The abscissa of the graph of FIG. 3 represents the total torque, i.e., $T_{in}$, being coupled into the left engine gear train 106L by means of the left engine output shaft 104L and the ordinate of the graph of FIG. 3 represents the torque distribution, i.e., split, between the forward and aft split load paths, i.e., the left spur pinion 114L, the left forward spur gear $116L_{Fwd}$, the left forward double helical bull pinion $118L_{Fwd}$, central bull gear 108 combination and the left spur pinion 114L, the left aft spur gear $116L_{Aft}$, the left aft double helical pinion $118L_{Aft}$, central bull gear 108 combination, respectively, for a given input torque $T_{in}$ coupled into the left engine gear train 106L.

Reference numeral 50 identifies the torque distribution curve for the forward split load path, i.e., the torque being coupled through the forward split load path of the left engine gear train 106L for a given input torque $T_{in}$ from the left engine, and reference numeral 52 identifies the torque distribution curve for the aft split load path, i.e., the torque being coupled through the aft split load path of the left engine gear train 106L for the given input torque $T_{in}$ from the left engine. The forward torque distribution curve 50 is defined by the equation $$T_{LFwd}=0.461\ (T_{in})+98 \qquad\qquad (Equation\ 1)$$

and the aft torque distribution curve 52 is defined by the equation $$T_{LAft}=0.5379\ (T_{in})-98 \qquad\qquad (Equation\ 2)$$

The slopes of the forward and aft torque distribution curves 50, 52, i.e., 0.4621 and 0.5379, respectively, correspond to the relative magnitudes of the net torsional spring rates of the forward and aft split load paths, respectively, of the left engine gear train 106L.

Figure 4:
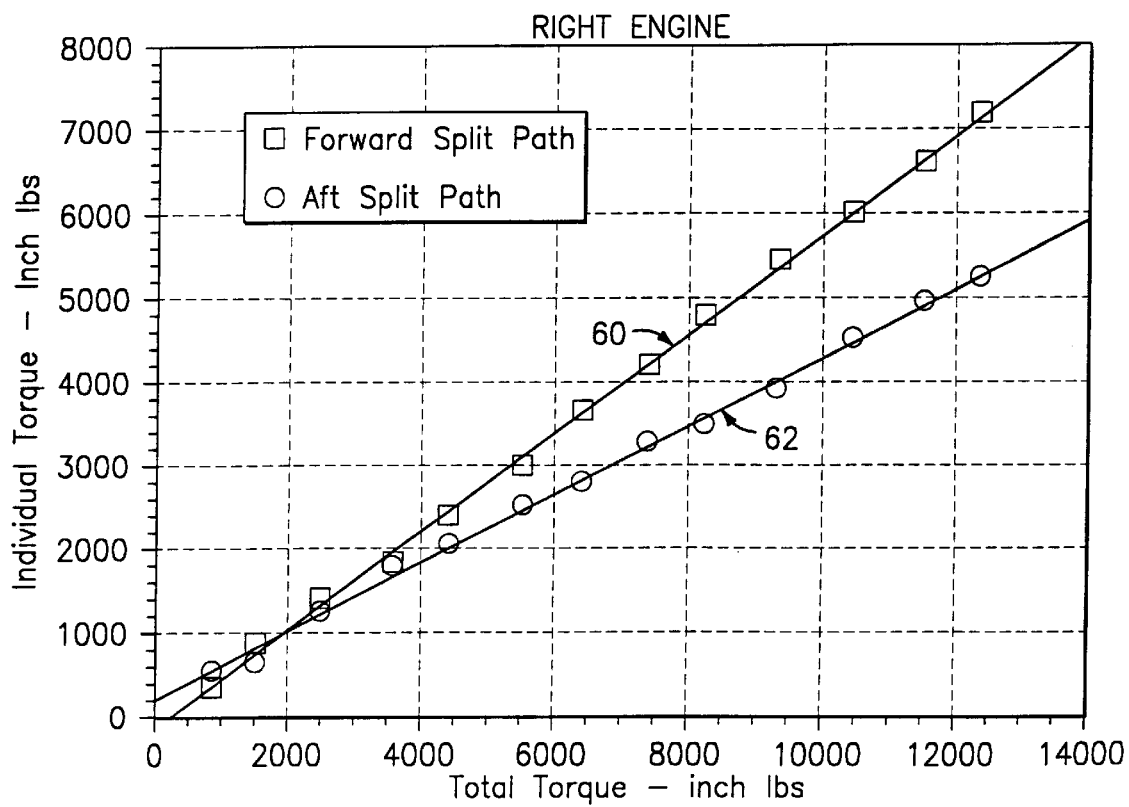
FIG. 4 is a graph illustrating the torque distribution curves for the forward and aft split load paths of the right engine gear train of the helicopter split path transmission system of FIG. 1.

Similarly, FIG. 4 is a graph illustrating the individual torque distribution curves for the forward and aft split load paths of the right engine gear train 106R. The abscissa of the graph of FIG. 4 represents the total torque, i.e., $T_{in}$, being coupled into the right engine gear train 106R by means of the right engine output shaft 104R and the ordinate of the graph of FIG. 4 represents the torque distribution, i.e., split, between the forward and aft split paths, i.e., the right spur pinion 114R, the right forward spur gear $116R_{Fwd}$, the right forward double helical bull pinion $118R_{Fwd}$, central bull gear 108 combination and the right spur pinion 114R, the right aft spur gear $116R_{Aft}$, the right aft double helical pinion $118R_{Aft}$, central bull gear 108 combination, respectively, for a given input torque $T_{in}$ coupled into the right engine gear train 106R.

Reference numeral 60 identifies the torque distribution curve for the forward split load path, i.e., the torque being coupled through the forward split load path of the right engine gear train 106R for a given input torque $T_{in}$ from the right engine, and reference numeral 62 identifies the torque distribution curve for the aft split load path, i.e., the torque being coupled through the aft split load path of the right engine gear train 106R for a given input torque $T_{in}$ from the right engine. The forward torque distribution curve 60 is defined by the equation $$T_{RFwd}=0.5902\ (T_{in})-179 \qquad\qquad (Equation\ 3)$$

and the aft torque distribution curve 62 is defined by the equation $$T_{RAft}=0.4098\ (T_{in})+179 \qquad\qquad (Equation\ 4)$$

The slopes of the forward and aft torque distribution curves 60, 62, i.e., 0.5902 and 0.4098, respectively, correspond to the relative magnitudes of the net torsional spring rates of the forward and aft split load paths, respectively, of the right engine gear train 106R.

An examination of FIGS. 3, 4 shows that for any given input torque $T_{in}$, the sum of the torques being coupled through the forward and aft split load paths of either gear train 106L/106R equals the given torque input $T_{in}$. For example, with reference to FIG. 3, for the input torque of 8,000 in-lb (904 joule) from the left engine, the forward torque distribution curve 50 indicates that about 3,800 in-lb (429 joule) of torque is being coupled through the forward split load path and the aft torque distribution curve 52 indicates that about 4,200 in-lb (475 joule) of torque is being coupled through the aft split load path. FIGS. 3, 4 further show that for any given input torque $T_{in}$ (except for the input torques $T_{in}$ of about 2,586 in-lb and 1,980 in-lb for the left and right gear trains 106L/106R, respectively) there is an unequal distribution or split of input torque $T_{in}$ between the forward and aft split load paths of the respective gear trains 106L/106R. For example, with reference to FIG. 4, for the input torque $T_{in}$ of 8,000 in-lb (904 joule) from the right engine, the forward torque distribution curve 60 indicates that about 4,600 in-lb (520 joule) of torque is being coupled through the forward split load path and the aft torque distribution curve 62 indicates that about 3,400 in-lb (384 joule) of torque is being coupled through the aft split load path.

Further examination of FIGS. 3, 4 reveals several resultant phenomenon with respect to the prototype of the split path transmission system 100 that was subjected to empirical testing. First, there is no correspondence between the individual torques being coupled through the forward and aft split load paths, respectively, of the left and right gear trains 106L/106R for any given input torque $T_{in}$. That is, the magnitudes of the torques being coupled through the forward split load paths of the left and right gear trains 106L/106R are dissimilar (likewise for the aft split load paths of the left and right gear trains 106L/106R). For example, for the input torque $T_{in}$ of 8,000 in-lb (904 joule), the forward torque distribution curve 50 indicates that about 3,800 in-lb (429 joule) is being coupled through the forward split load path of the left gear train 106L while the forward torque distribution curve 60 indicates that about 4,600 in-lb (520 joule) is being coupled through the forward split load path of the right gear train 106R.

Secondly, it should also be noted that, for higher input torques $T_{in}$, i.e., $T_{in}>4,000$ in-lb (452 joule), the relationship between the forward and aft torque distribution curves 50, 52 indicates that more torque is being coupled through the aft split load path of the left gear train 106L than through the forward split load path. Conversely, however, in the right gear train 106R, the relationship between the forward and aft torque distribution curves 60, 62 indicates that more torque is being coupled through the forward split load path than the aft split load path.

FIGS. 3, 4 also show two further resultant phenomena with respect to the torque distribution curves 50, 52/60, 62 for the split load paths of the left and right branches 106L/106R, respectively. First, that the forward and aft torque distribution curves 50, 52/60, 62 do not intersect at the origin, i.e., the condition of no load or zero torque input. Secondly, that the forward and aft torque distribution curves 50, 52 of FIG. 3 diverge with increasing input torque $T_{in}$ for $T_{in} > 2,586$ in-lb (292 joule), with the divergence increasing with increasing input torque $T_{in}$. A similar conclusion may be drawn from an examination of the forward and aft torque distribution curves 60, 62 of FIG. 4 (note, however, that that the divergence of the torque distribution curves 60, 62 with increasing torque is with respect to $T_{in} > 1,980$ in-lb (224 joule), and that the divergence between the torque distribution curves 60, 62 is more pronounced than the divergence between the torque distribution curves 50, 52).

The inventors recognized that these phenomenon were indicative of underlying causative factors inherent in the split path transmission system 100 that prevented achievement of equal load splitting in the forward and aft split load paths of the left and right gear trains 106L/106R, respectively. The inventors undertook analytical and empirical analyses of these phenomenon for the purpose of identifying and understanding the underlying causative factors and interactions with the end of attaining the objective of designing a split path transmission system to achieve equal torque splitting in the forward and aft split load paths of each engine gear train a predefined operating point.

With respect to the no-load phenomenon, the forward and aft torque distribution curves 50, 52 of the left gear train 106L (or the forward and aft torque distribution curves 60, 62 of the right gear train 106R) should intersect at the origin since the prototype transmission that was tested was designed so that every gear member should have a tooth in contact at the no-load condition. This condition is referred to as a gear train timing of zero degrees. An empirical examination of the gears and pinions comprising the split load paths of the prototype of the split path transmission system 100 showed that the tolerances of such gears and pinions were well within design specification tolerances, i.e., no built-in timing error due to the manufacturing process. To facilitate a more complete understanding of the method according to the present invention, FIGS. 5A, 5B are presented to illustrate the concept of gear timing and tooth contact at the no-load condition.

Figure 1:
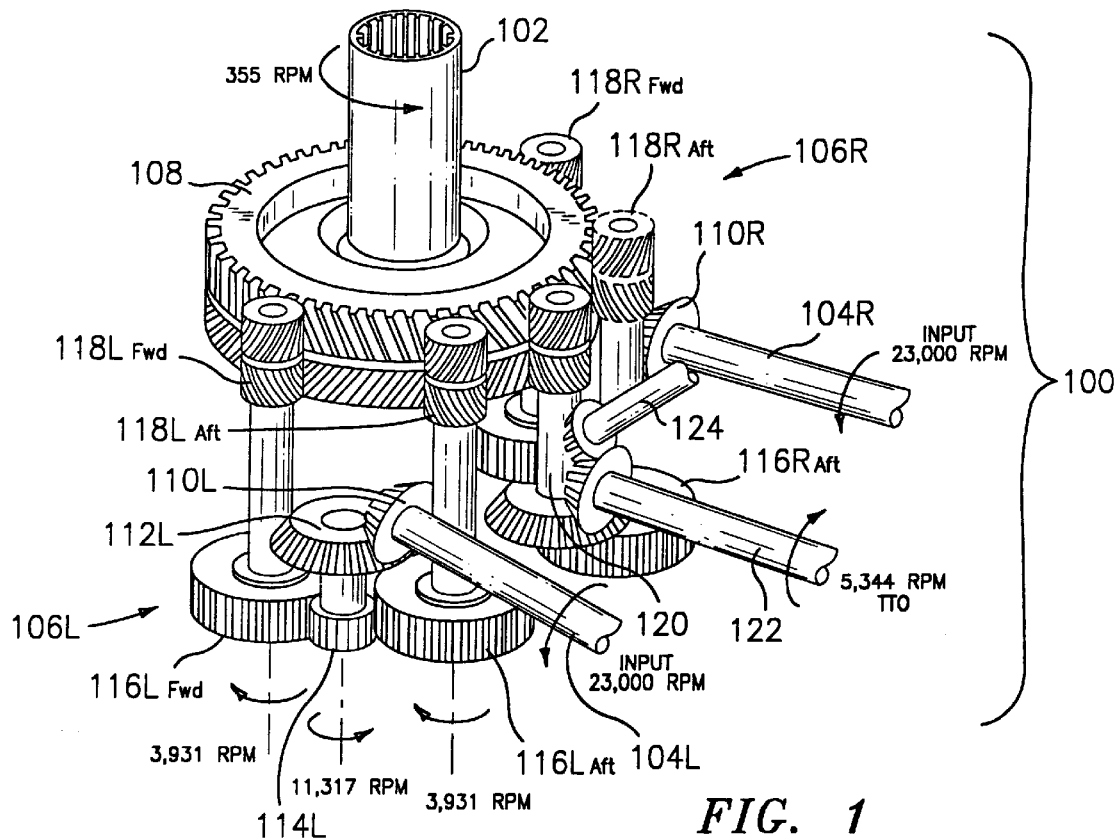
FIG. 1 is a perspective view of an exemplary embodiment of a helicopter split path transmission system configured for use in combination with a powerplant system composed of two engines.
Figure 2:
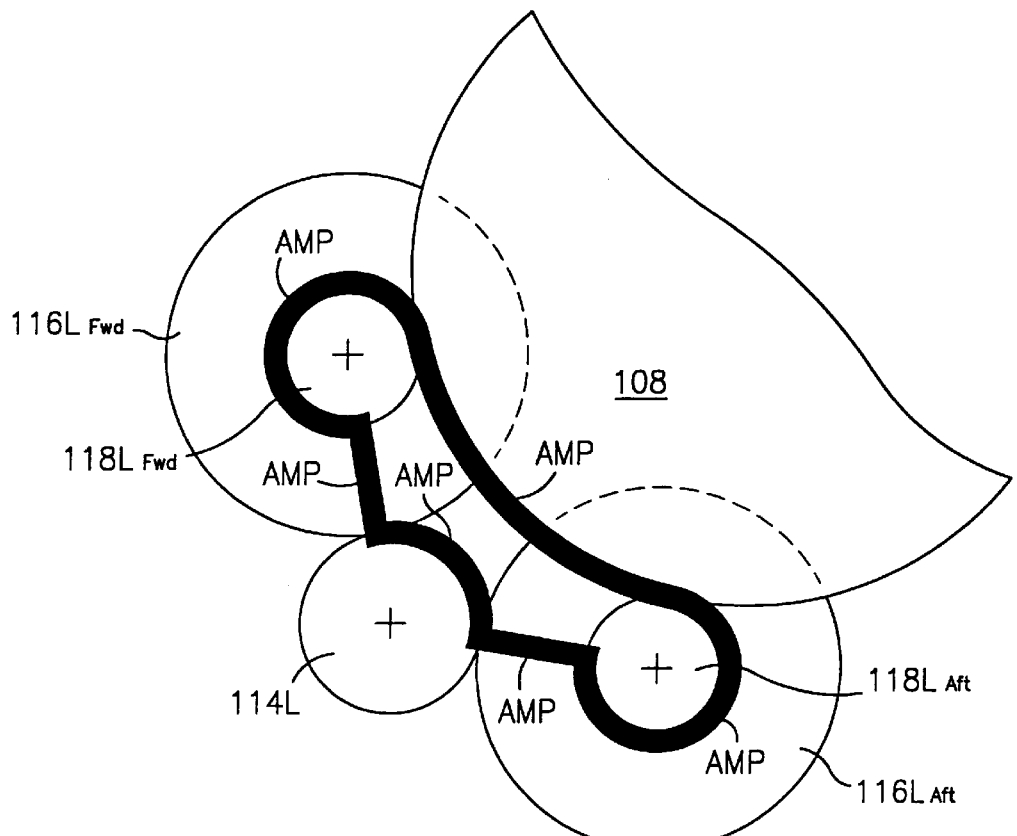
FIG. 2 is a top plan schematic view illustrating the arc mesh path of the forward and aft split load paths of the left engine gear train of the helicopter split path transmission system of FIG. 1.
Figure 5:
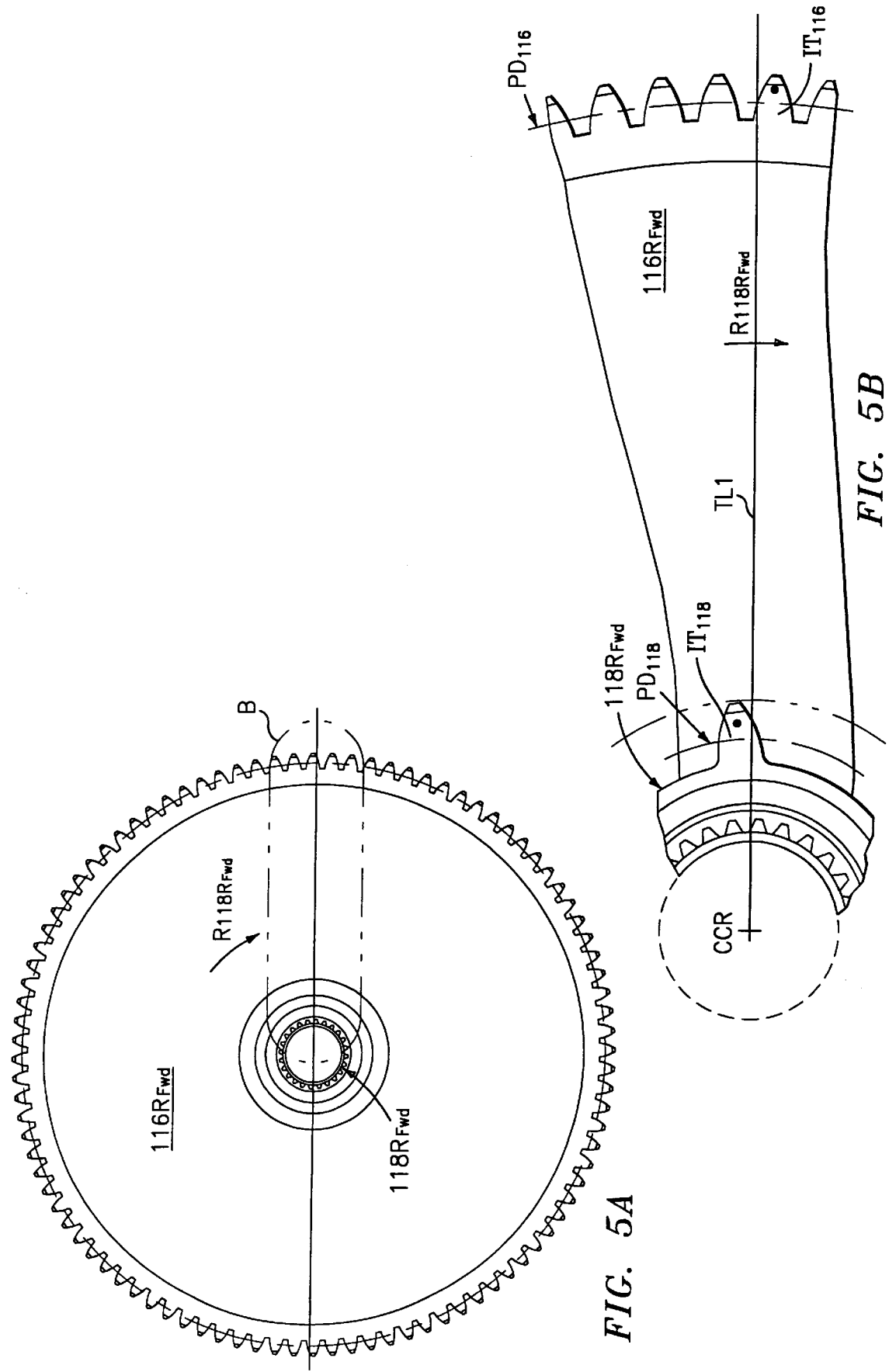
FIG. 5A is a top plan view of the forward spur gear, double helical bull pinion combination of the right gear train of FIG. 1.
FIG. 5B is an enlarged partial plan view of FIG. 5A taken along loop B thereof depicting a timing relationship of 0° for the forward spur gear, double helical bull pinion combination.

FIG. 5A illustrates the forward spur gear $116R_{Fwd}$ and the forward double helical bull pinion $118R_{Fwd}$ of the right gear train 106R which are disposed in coaxial combination on a compound shaft (see also FIG. 1). Gear timing is defined in terms of the angular relationship between the pitch point on the drive side of the index tooth of the right forward spur gear $116R_{Fwd}$ and the pitch point on the drive side of the index tooth of the right forward double helical bull pinion $118R_{Fwd}$. Referring to FIG. 5B, the pitch diameters of the spur gear $116R_{Fwd}$ and the double helical bull pinion $118R_{Fwd}$ are defined by reference characters $PD_{116}$ and $PD_{118}$, respectively, and the index teeth of the spur gear $116R_{Fwd}$ and the double helical bull pinion $118R_{Fwd}$ are identified by reference characters $IT_{116}$ and $IT_{118}$, respectively.

The pitch points of the index teeth $IT_{116}$, $IT_{118}$ are defined by the intersection of the respective pitch diameters $PD_{116}$, $PD_{118}$ with the loaded side of the corresponding index tooth $IT_{116}$, $IT_{118}$. A first timing line TL1 is extended outwardly from the coaxial center of rotation CCR of the compound shaft to pass through the pitch point of the index tooth $IT_{118}$ of the right forward double helical bull pinion $118R_{Fwd}$. For the illustrated example, the timing line TL1 also passes through the pitch point of the index tooth $IT_{116}$ of the right forward spur gear spur gear $116R_{Fwd}$ such that the angular relationship or gear timing between the right forward spur gear spur gear $116R_{Fwd}$ and the right forward double helical bull pinion $118R_{Fwd}$ is 0°. The prototype transmission system that was empirically tested was designed such that, theoretically, at the no-load condition with a 0° timing relationship as illustrated, the driven side of the right forward spur gear $116R_{Fwd}$ should be in mechanical contact with the drive side of the right spur pinion 114R and the drive side of the right forward double helical bull pinion $118R_{Fwd}$ should be in mechanical contact with the drive side of the central bull gear 108.

The inventors determined that several factors account for the fact that the distribution curves 50, 52/60, 62 do not converge at the no-load condition, including tolerances associated with the bearing bore locations (mounting sites for the bearings supporting the gears and pinions comprising the left and right torque-transmission branches 106L/106R of the split path transmission system 100) and the topological modifications of the teeth of the respective gears and pinions comprising the left and right split load paths. Topological modifications of the teeth of such gears and/or pinions are effected to ensure proper mesh at the predefined operating point, i.e., to counterbalance the effect of teeth deflections at the predefined operating point—see, e.g., the discussion in the specification of U.S. Pat. No. 5,315,790 entitled "Gear Tooth Topological Modification". These topological modifications, however, cause the teeth to contact at different timing positions at the no-load condition (rather than, for example, at the theoretical 0° timing position described hereinabove).

With respect to the other phenomenon described hereinabove, i.e., divergence of the forward and aft torque distribution curves 50, 52/60, 62 of the left and right gear trains 106L/106R, respectively, the disparity in torque load distributions between the forward and aft split load paths, respectively, of the left and right gear trains 106L/106R, and the disparate divergence rates between the left-branch torque distribution curves 50, 52 and the right-branch torque distribution curves 60, 62, the inventors determined that such phenomenon are due to the cumulative effect of the disparate deflections affecting the intermeshing gears and pinions comprising the respective forward and aft split load paths of the prototype of the split path transmission system 100 described hereinabove. Such disparate deflections include gear tooth Hertzian deflections, gear tooth bending deflections, gear tooth rim effects, spur gear/double helical pinion shaft torsion and deflections, spur pinion/bevel gear shaft deflections, bearing deflections, and housing deflections due to loading and/or thermal effects. Such disparate deflections are the result of the mesh forces between the interacting gears and pinions of the forward and aft split load paths of the left and right gear trains 106L/106R.

A computerized analytical calculation of the gear mesh forces and resulting deflections of the split load paths of the split path transmission system 100 was conducted. The spiral bevel gear mesh forces were calculated by standard equations to define the tangential, separating, and thrust forces acting on the spiral bevel gear. The identified tangential and separating forces were combined as a single vector in the local X-Y coordinate system (a local Cartesian coordinate system was defined for each split load path wherein the local Z axis was coincident with the central bull gear centerline and Z=0 was located at the imaginary apex of the double helical mesh). A transverse plane gear force analysis was conducted on the spur pinion, spur gears, and double helical bull pinion meshes using input torque, the transverse plane base radii, and the X-Y positions of the gear centers as input parameters. Output parameters from the analytical calculation included output torque, the mesh force as a vector acting on the gear base radius, and the operating pressure angle. The axial forces of the helical meshes were calculated once the transverse plane results were obtained.

The next step was a computerized calculation of the deflections produced by the calculated gear mesh forces. The mean of the time-varying gear mesh stiffness was used to calculate the gear teeth deflections. The time-varying gear mesh stiffness was determined using Cornell's method to determine a single tooth pair stiffness, and then the gear contact ratio was considered to determine mesh stiffness. Compound shaft torsion was calculated using a spring constant. For the described embodiment, a spring constant value of 5.93×10E04 in-lb/deg was used based upon the known material composition and geometry of the compound shaft. The bull gear support deflection was calculated using a spring constant along the centerline of the aircraft and a spring constant perpendicular to the centerline (for the described embodiment, spring constants having values of 8.96×10E06 lb/in and 3.46×10E06 lb/in, respectively) as calculated by finite element analysis. The input shaft and compound shaft deflections were calculated by means of the classical Euler equation for the elastic curve of a beam. The complex shapes of the respective beams were approximated as a series of sections having constant or linearly varying moments of inertia, and the necessary mathematical boundary conditions were imposed by assuming that the shaft supports were "semi-fixed" (average of pinned support and fixed supports). The resultant set of differential equations for the beam approximations were integrated and then solved by matrix algebra. Beam deflections in both the X-Z and Y-Z planes were calculated, and the solutions were added as vectors. Bearing deflections were calculated using bearing reaction forces (determined based upon the calculated beam deflections) using methods know to those skilled in the art.

Figure 6:
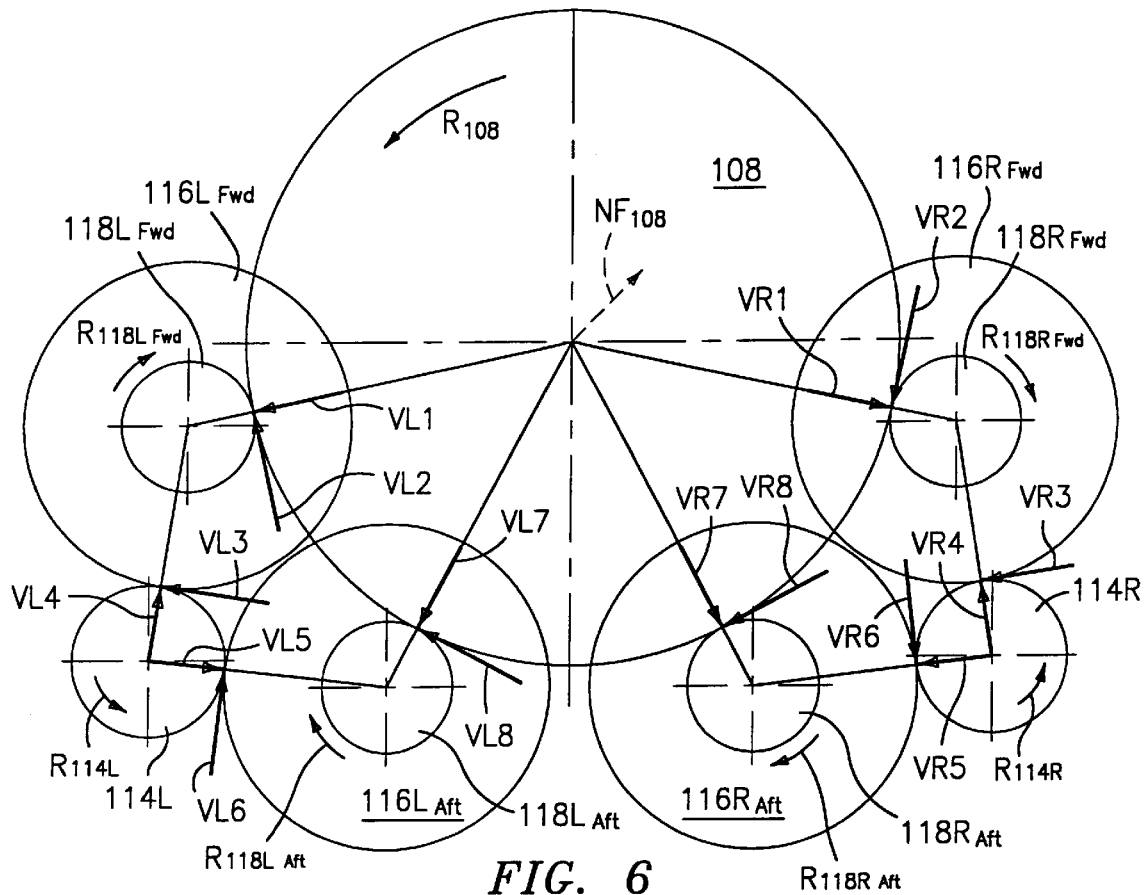
FIG. 6 is a top plan view schematic illustrating the torque and gear load vectors acting on the gear shafts of the forward and aft split load paths of the left and right gear trains of the helicopter split path transmission system of FIG. 1.

These calculations revealed that the deflections arising as a result of the mesh forces between the interacting gears and pinions of the split path transmission system 100 are dependent upon the "dynamic geometry" of the split path transmission system 100, i.e., the magnitude of the individual mesh forces (deflections) and the direction of such applied loads (deflections) with respect to individual gears, pinions, and gear shafts and with respect to the gross structural configuration of the split path transmission system. For example, FIG. 6 is a schematic representation of the torque and reaction vectors acting on the gear shafts of the forward and aft split load paths, respectively, of the left and right gear trains 106L/106R, i.e., the mesh forces (deflections) identified in terms of direction as well as magnitude. The vectors are identified generally by reference characters "VR1–VR8" and "VL1–VL8", respectively. Also identified in FIG. 6 by means of reference characters "R" and appropriate subscripts are the directions of rotation of the gears and pinions comprising the forward and aft split load paths of the left and right gear trains 106L/106R, respectively.

An examination of FIG. 6 shows that the net force (or deflection) acting on the upper end of the left-branch compound shaft due to the vector addition of VL1 and VL2 is dissimilar to the net force (or deflection) acting on the upper end of the right-branch compound shaft due to the vector addition of VR1 and VR2. With respect to the lower end of the compound shaft, the net force (or deflection) in the left branch due to the vector addition of VL3 and VL4 is dissimilar to the net force (or deflection) in the right branch due to the vector addition of VR3 and VR4.

Similar results follow for the disparate mesh forces (or deflections) affecting the individual gears and pinions of the left and right gear trains 106L/106R, respectively. For example, it was determined that the net force acting on the central bull gear 108 causes a lateral deflection of the central bull gear 108 center in the direction of arrow $NF_{108}$ (identified by the dashed arrow and reference characters $NF_{108}$ in FIG. 6). This lateral deflection is approximately coincident with a line joining the central bull gear 108 center and the left spur pinion 114L center. Considering such a lateral deflection, the loaded windups (as used herein, the total "windup" is the total effect of lateral movement and tooth deflections in the helical bull pinions 118, torsional twist induced in the compound shaft, and lateral movement and tooth deflections in the spur gears 116) in the forward and aft split load paths, respectively, of the left gear train 106L are approximately equal, but the loaded windups in the forward and aft split load paths, respectively, of the right gear train 106R are dissimilar. Or, for example, the mesh force exerted by the bevel pinion 110L of the left gear train 106L tends to deflect the left spur pinion 114L into meshing engagement with the forward and aft left spur gears $116L_{Fwd}$, $116L_{Aft}$. Conversely, the mesh force exerted by the bevel pinion 110R of the right gear train 106R tends to deflect the right spur pinion 114R out of meshing engagement with the forward and aft left spur gears $116R_{Fwd}$, $116R_{Aft}$.

As a result of an analytical evaluation based upon the directional aspects of the mesh forces between the interacting gears and pinions of the split path transmission system 100, and concomitantly, the deflections produced by such mesh forces, the inventors determined that: (i) the net effect of the vector addition of such mesh forces (or deflections) on the left and right gear trains 106L/106R, respectively, is dissimilar; and (ii) the net effect of the vector addition of such mesh forces (or deflections) on the forward and aft split load paths of the left and right gear trains 106L/106R, respectively, is dissimilar. That is, since the magnitude of the total loaded windups will, as a rule, be different in each of the split load paths of each gear train 106L/106R, the slope of the line represented by a graph of $T_{in}$ versus $T_{individual}$ will be different in each split load path of each gear train 106L/106R.

The inventors concluded that the disparity in the total loaded windups produced an unequal distribution of torque between the forward and aft split load paths of each of the gear trains 106L/106R. That is, the dynamic geometry of the split path transmission system 100 results in torque distribution curves having disparate slopes that are unique to each set of split load paths, e.g., the forward torque distribution curve 50 (or 60) versus the aft torque distribution curve 52 (or 62), as well as between split load paths of the left and right gear trains 106L/106R, e.g., the left forward (or aft) torque distribution curve 50 (or 52) versus the right forward (or aft) torque distribution curve 60 (or 62). Furthermore, the inventors concluded that the unequal torque distribution between the forward and aft split load paths of the gear trains 106L/106R could be adjusted by changing the gear train timing (as illustrated in FIGS. 5A, 5B and previously described) appropriately such that the load would be shared equally between the forward and aft split load paths at a predefined operating point.

To accomplish the appropriate gear train timing adjustment, first, the resultant torque distribution curves 50, 52/60, 62 of the forward and aft split load paths of the left and right gear trains 106L/106R must have been ascertained by empirical or analytical means. Then, the forward and aft torque distributions curves 50, 52/60, 62 of each gear train 106L/106R are analytically manipulated to identify the requisite timing dimension for the forward and aft split load paths of each gear train 106L/106R so that an equal torque distribution between the forward and aft split load paths at a predefined operating point is achieved. The first step in such analytical manipulation is to identify the predefined operating or design point for the split path transmission system 100, i.e., the input torque $T_{in}$ wherein an equal load splitting between the forward and aft split load paths of each gear train 106L/106R is desired.

Figure 7:
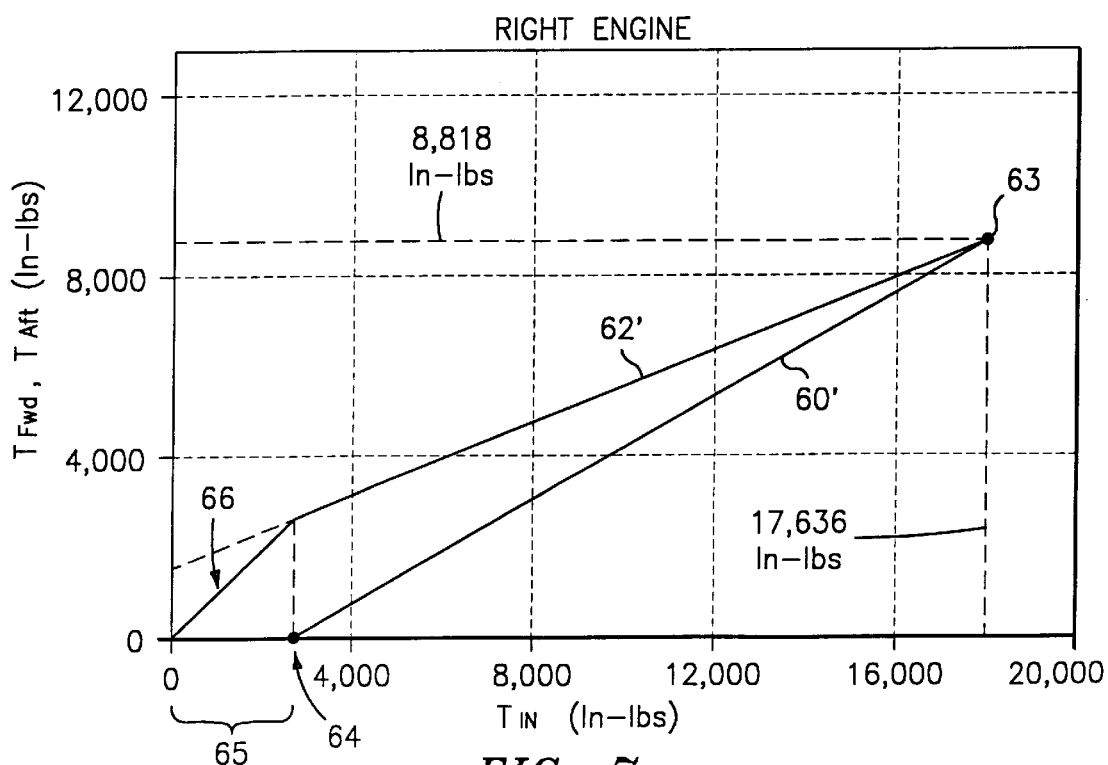
FIG. 7 is a graph illustrating the analytically-modified torque distribution curves for the forward and aft split load paths of the right engine gear train of the helicopter split path transmission system of FIG. 1.

The predefined operating point is quantified in terms of the torque output from the associated engine at some specified flight operating condition (see, e.g., FIG. 7 wherein reference numeral 63 identifies the predefined operating or design point for a specific application). For military helicopters, for example, the predefined operating point may be quantified with respect to the contingency rated power (a short duration, very high engine power rating generally intended for one-engine inoperative (OEI) or emergency operation), the intermediate rated power (a high engine power rating limited to thirty minutes duration—also identified as military power), the maximum continuous power rating (the maximum power rating at which the engine can be operated continuously—also identified as "normal" or "100%" power), or the cruise power rating (the power rating that optimizes the flight operating time or specific fuel consumption of the helicopter).

Preferably, the predefined operating point is defined in terms of the power rating that encompasses the predominant span of the flight operating profile so that the split path transmission system 100 is operated with equal torque splitting between the forward and aft split load paths of each gear train 106L/106R for most of the flight operating profile. This ensures that unequal gear train tooth loading, i.e., deleterious mechanical effects due to meshing interaction between gears and pinions, in the split path transmission system 100 is minimized.

By way of example, the predefined operating or design point for the described embodiment of the split path transmission system 100 was quantified at the 100% power rating at the left and right helical bull pinions 118L, 118R, i.e., $T_{in}$=17,636 in-lb (1,993 joule). Once the predefined operating point is specified, the forward and aft torque distribution curves 50, 52/60, 62 of each gear train 106L/106R are analytically manipulated by transposing the forward and aft torque distribution curves 50, 52/60, 62 of each gear train 106L/106R so that each torque distribution curve 50, 52/60, 62 passes through the predefined operating point, i.e., $T_{in}$= 17,636 in-lb (1,993 joule) wherein $TR_{RFwd}=T_{RAft}$=8,818 in-lb (996 joule), i.e., the equal load sharing point. The transposition of the forward and aft torque distribution curves 50, 52/60, 62 of each gear train 106L/106R is effected so that the slopes of the respective torque distribution curves 50, 52/60, 62 remains constant, i.e., the net torsional spring rates of the forward and aft split load paths of each gear train 106L/106R are unchanged.

FIG. 7 illustrates the analytically-manipulated forward and aft torque distribution curves for the right gear train 106R described hereinabove (the analytically-manipulated forward and aft torque distribution curves are identified by reference numerals 60' and 62', respectively, and correspond to the forward and aft torque distribution curves 60 and 62, respectively, illustrated in FIG. 4). Mathematically, the analytically-manipulated forward and aft torque distribution curves 60', 62' are defined by the equations $$T_{RFwd}=0.5902\ (T_{in})-1591 \qquad (Equation\ 5),$$

and $$T_{RAft}=0.4098\ (T_{in})+1591 \qquad (Equation\ 6).$$

The constants of equations 5, 6 define the intersection of the respective analytically-manipulated torque distribution curve 60', 62' with the ordinate axis and are proportional to the magnitude of the change in the gear train timing dimension required in the forward or aft split load path of the right gear train 106R to achieve equal torque distribution at the predefined operating point of T in=17,636 in-lb (1,993 joule).

An examination of FIG. 7 shows that the analytically-manipulated forward torque distribution curve 60', which has the steeper slope, i.e., 0.5902 versus 0.4098 for the analytically-manipulated aft torque distribution curve 62', intercepts the abscissa at about $T_{in}$=2,696 in-lb (305 joule) (see reference character 64). The input torque defined by interception point 64 is proportional to the degree of "relief" that must be effected in the timing of the forward split load path of the right gear train 106R. Once the relief has been effectuated, all of the torque coupled into the right gear train 106R is transmitted through the aft split load path of the right gear train 106R over an input torque range 65 of $T_{in}$=0 in-lb (0 joule) to $T_{in}$=2,696 in-lb (305 joule). This phenomenon is indicated by reference character 66 in FIG. 7 which identifies the total-torque segment of the analytically-manipulated aft torque distribution curve 62' wherein all of the input torque $T_{in}$ coupled into the right gear train 106R is transmitted through the aft split load path, i.e., the slope of the segment 66 of the aft torque distribution curve 62' is 1.0 ($T_{in}=T_{RAft}$).

Once the input torque $T_{in}$ exceeds the value of $T_{in}$=2,696 in-lb (305 joule), torque is transmitted through the forward split load path at a progressively increasing rate (see analytically-modified forward torque distribution curve 60') such that equal torque splitting between the forward and aft split load paths is achieved at the predefined operating point, i.e., $T_{in}$=17,636 in-lb (1,993 joule) wherein $T_{RFwd}=T_{RAft}$=8, 818 in-lb (996 joule). Equal torque splitting occurs since the analytically-modified forward and aft torque distribution curves 60', 62' of the right gear train 106R are converging instead of diverging (contrast with the forward and aft torque distribution curves 60, 62 of FIG. 4 which are diverging at the 100% power rating). While the right gear train 106R will be subjected to deleterious tooth loading as the input torque $T_{in}$ is increased beyond that of the predefined operating point, i.e., $T_{in}$=17,636 in-lb (1,993 joule), due to asymmetrical loading in the forward and aft split load paths, it will be appreciated that proper selection of the predefined operating point ensures that such time of operation, and hence, the effects of deleterious tooth loading, is minimized, i.e., the predefined operation or design point by definition encompasses the predominant span of the flight operating profile.

The foregoing procedure is repeated for the forward and aft torque distribution curves 50, 52 of the left gear train 106L to define the analytically-modified forward and aft torque distribution curves therefor so that the timing change required in the forward or aft split load paths of the left gear train 106L can be quantified. It will be appreciated that, due to the slopes of the forward and aft torque distribution curves 50, 52, the timing change in the left gear train 106L will be dissimilar from the timing change required in the right gear train 106R. In point of fact, since the aft torque distribution curve 52 has the steeper slope (0.5379 versus 0.4621 for the forward torque distribution curve 50), the aft split load path of the left gear train 106L must be "relieved" such that initially all input torque $T_{in}$ will be transmitted through the forward split load path of the left gear train 106L.

To mechanically effectuate the timing changes identified by the foregoing procedure, the timing relationship of the index teeth of one split load path of each gear train 106L/106R is modified during fabrication of the gears and pinions of the respective gear train 106L/106R to achieve equal torque splitting at the predefined operating point. With respect to the example regarding the forward and aft split load paths of the right gear train 106R described in the preceding paragraphs, the timing relationship of the index teeth in the forward split load path, i.e., the index teeth $IT_{116}$, $IT_{118}$ of the right forward spur gear $116R_{Fwd}$, right forward double helical bull pinion $118R_{Fwd}$ combination, is modified (relieved in the described example) so that torque is not transmitted through the forward split load path until input torque $T_{in}$ exceeds 2,696 in-lb (305 joule).

Figure 8:
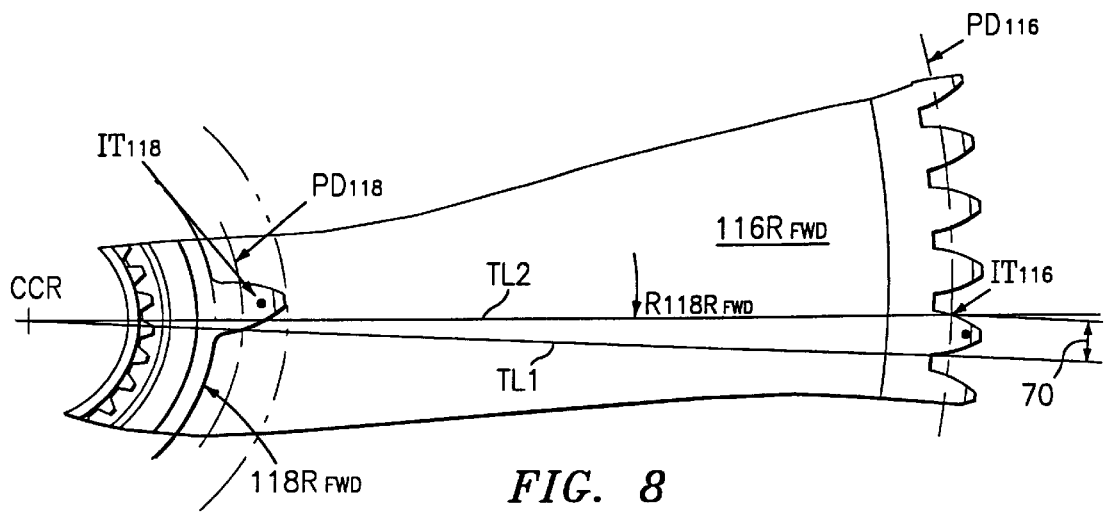
FIG. 8 is a partial top plan view of the forward spur gear, double helical bull pinion combination of FIG. 5A illustrating the timing relationship as modified according to the method of the present invention wherein there is equal torque splitting in the forward and aft split load paths of the right gear train at 100% operating power.

This is exemplarily illustrated in FIG. 8 which depicts the right forward spur gear $116R_{Fwd}$ and the right forward helical bull pinion $118R_{Fwd}$ as fabricated with the modified timing relationship. The first timing line TL1, which passes through the pitch point of the index tooth $IT_{118}$ of the right forward helical bull pinion $118R_{Fwd}$, does not pass through the pitch point of the index tooth $IT_{116}$ of the right forward spur gear $116R_{Fwd}$. A second timing line TL2 is extended outwardly from the coaxial center of rotation CCR to pass through the pitch point of the index tooth $IT_{116}$ of the right forward spur gear $116R_{Fwd}$. The perpendicular distance (at the pitch point of the index tooth $IT_{116}$) between the first and second timing lines TL1, TL2 defines a gap 70 that quantifies the timing relationship between the index tooth $IT_{116}$ of the right forward spur gear $116R_{Fwd}$ and the index tooth $IT_{118}$ of the right forward helical bull pinion $118R_{Fwd}$ that provides equal torque splitting between the forward and aft split load paths of the right gear train 106R at the predefined operating point. The magnitude of the gap 70 is the ratio of the interception point between the abscissa and the analytically-modified torque distribution curve having the steeper slope divided by the net torsional spring rate of the split load path having a torque distribution curve with the lesser slope.

Once the timing adjustment has been introduced, then at the no-load condition the gap 70 results in a spatial separation, i.e., no mechanical contact, between the gear teeth of the right forward helical bull pinion $118R_{Fwd}$ and the gear teeth of the central bull gear 108. Concomitantly, however, the gear teeth of the right aft helical bull pinion $118R_{Aft}$ and the teeth of the central bull gear 108 are in mechanical contact at the no-load condition.

Input torque $T_{in}$ initially coupled into the right gear train 106R causes simultaneous rotation of the forward and aft spur gears $116R_{Fwd}$, $116R_{Aft}$ (via meshing interactions between the right bevel pinion 110R, right bevel gear 112R, and the right spur pinion 114R). The rotation of the aft spur gear $116R_{Aft}$ results in all of the input torque $T_{in}$ being transmitted to the main rotor shaft 102 through the aft split load path as a result of the meshing interaction between the gear teeth of the right aft helical bull pinion $118R_{Aft}$ and the gear teeth of the central bull gear 108.

The rotation of the forward spur gear $116R_{Fwd}$, in contrast, does not cause meshing interaction between the forward helical bull pinion $118R_{Fwd}$ and the central bull gear 108, but rather results in freewheeling therebetween. However, as the input torque is increased there is a continuing reduction in the spatial separation between the gear teeth of the forward helical bull pinion $118R_{Fwd}$ and the gear teeth of the central bull gear 108 due elastic deformations of the loaded components of the aft split load path. As the input torque $T_{in}$ exceeds 2,696 in-lb (305 joule), meshing interaction between the gear teeth of the forward helical bull pinion $118R_{Fwd}$ and the gear teeth of the central bull gear 108 occurs such that torque is coupled through both the forward and aft split load paths in the manner described hereinabove.

Figure 9:
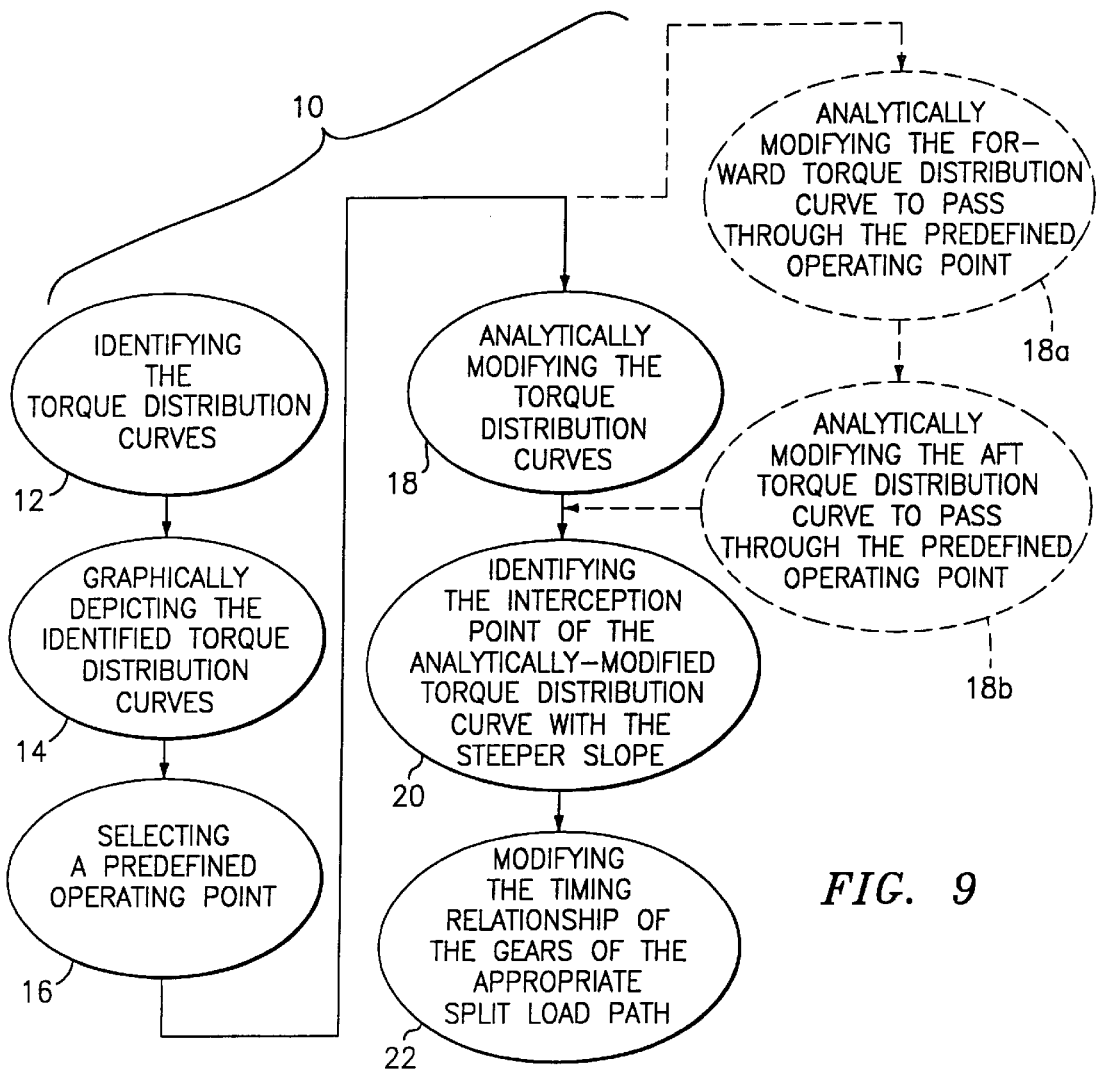
FIG. 9 is a schematic representation of the steps of the method according to the present invention for fabricating a split path transmission system that provides equal torque splitting between the split load paths of each gear train thereof at a predefined operating point.

A method 10 according to the present invention for fabricating a split path transmission system that provides equal torque splitting between the forward and aft split load paths of each gear train thereof at a predefined operating point by providing an intentional timing difference between the forward and aft split load paths of each gear train has been described in detail in the preceding paragraphs with respect to a particular embodiment of the split path transmission system 100. To summarize, with reference to FIG. 9, the method 10 includes:

a step 12 of identifying the torque distribution curves for the forward and aft split load paths of one gear train of the split path transmission system by either empirical or analytical means;

a step 14 of depicting the forward and aft torque distribution curves identified in step 12 in a graphical format wherein the abscissa of the graph represents input torque $T_{in}$ coupled into the one gear train from the associated engine and the ordinate of the graph represents the torque being transmitted through the forward and aft split load paths, respectively;

a step 16 of selecting a predefined operating point for the split path transmission system wherein equal torque splitting between the forward and aft split load paths of the one gear train is desired;

A step 18 of analytically modifying the forward and aft torque distribution curves as required, including the substeps of a substep 18a of analytically modifying the forward torque distribution curve such that the forward torque distribution curves passes through the predefined operating point; and/or a sub step 18b of analytically modifying the aft torque distribution curve such that the aft torque distribution curves passes through the predefined operating point;

a step 20 of identifying an interception point with the abscissa of the analytically-modified forward or aft torque distribution curve having the steeper slope to quantify an input torque range; and a step 22 of altering the timing relationship of the gears and pinions of the split load path represented by the analytically-modified torque distribution curve having the steeper slope to provide an intentional timing difference between the gears and pinions of the forward and aft split load paths of the one gear train so that during operation of the split path transmission system the other split load path transmits all torque input $T_{in}$ to the main rotor shaft over the input torque range.

Step 18 may be broken down into two substeps, 18a, 18b, as described hereinabove. It will be appreciated that once the forward and aft split load paths have been identified and depicted in graphical format in steps 12, 14 described hereinabove, the split load path having the steeper slope is readily identifiable. At a minimum, only the torque distribution curve having the steeper slope needs to be analytically modified to provide identification and quantification of the input torque range (see step 20). For completeness, both the forward and aft torque distribution curves may be analytically modified by means of steps 18a and 18b.

Step 22 involves the alteration, either during initial fabrication or by subsequent modification, e.g., grinding, of prefabricated gears and pinions, of the intermeshing gears and pinions of the forward or aft split load path represented by the analytically-modified torque distribution curve having the steeper slope so that the timing relationship of such intermeshing gears and pinions is dissimilar to the timing relationship of the corresponding gears and pinions of the other split load path, i.e., an intentional timing difference is effected between the forward and aft split load paths of each gear train of the split path transmission system 100. Once the alteration step has been accomplished, the split path transmission system should be subjected to empirical testing to verify that an equal torque splitting between the forward and aft split load paths of the one gear train has been achieved at the predefined operating point. If required, steps 12–22 may be repeated as necessary for the one gear train until equal torque splitting between the forward and aft split load paths of the one gear train is achieved. Steps 12–22 are further implemented for each remaining gear train of the split path transmission system (e.g., for the embodiment of the split path transmission system 100 described hereinabove, the left gear train 106L) to achieve an intentional timing difference between the forward and aft split load paths of such gear train(s).

While the foregoing disclosure of the method according to the present invention has been presented in terms of a split path transmission system having two independent gear trains, it will be appreciated that the method of the present invention is applicable to split path transmission systems composed of a single gear train or more than two independent gear trains, e.g., three independent gear trains.

Therefore, although the method according to the present invention has been shown and described herein with respect to a certain detailed embodiment of a split path transmission system, it will be understood by those skilled in the art that a variety of modifications and variations of the method are possible in light of the above teachings. It is therefore to be understood that, within the scope of the appended claims, the present invention may be practiced otherwise than as specifically described hereinabove.

What is claimed is:

1. A method of fabricating a split path transmission system including at least one gear train having forward and aft split load paths, comprising the steps of:
   (a) identifying torque distribution curves of the forward and aft split load paths of the at least one gear train of the split path transmission system either empirically or analytically;
   (b) depicting the forward and aft torque distribution curves of step (a) in a graphical format wherein an abscissa of the graph represents torque input Tin coupled into the at least one gear train and an ordinate of the graph represents torque transmitted through the forward and aft split load paths, respectively;
   (c) selecting a predefined operating point for the split path transmission system wherein equal torque splitting between the forward and aft split load paths of the at least one gear train is desired;
   (d) analytically modifying the forward and aft torque distribution curves as required to pass through the predefined operating point;
   (e) identifying an interception point of the abscissa with the analytically-modified forward or aft torque distribution curve having the steeper slope to quantify an input torque range; and
   (f) altering a timing relationship of the gears and pinions of the split load path represented by the analytically-modified torque distribution curve having the steeper slope to provide an intentional timing difference between the gears and pinions of the forward and aft split load paths, respectively, wherein during operation of the split path transmission system the other split load path transmits all torque input Tin to an output shaft over the input torque range.

2. The method of claim 1 further comprising a step of:
   (g) empirically testing the split path transmission system to verify that equal load splitting between the forward and aft split load paths is occurring at the predefined operating point.

3. The method of claim 2 further comprising the step of:
   (h) repeating steps (a)–(g) as required until equal torque splitting between the forward and aft split load paths of the split path transmission system is achieved.

4. The method of claim 1 further comprising the step of:
   (i) implementing steps (a)–(f), as required, for each remaining gear train of the split path transmission system to provide an intentional timing difference between the gears and pinions of the forward and aft split load paths, respectively, of each remaining gear train such that equal torque splitting in the forward and aft split load paths of each remaining gear train is achieved at the predefined operating point.

5. A split path transmission system, comprising:
   at least one engine output shaft (104) including a pinion for transmitting torque from an engine;
   at least one gear train (106) mechanically coupled to said engine output shaft (104) for receiving torque therefrom, said gear train (106) including
      a first reduction stage including said pinion (110) and a gear (112) disposed in intermeshing combination therewith,
      a second reduction stage including a pinion (114) mounted in rotatable combination with said gear (112) and forward and aft gears ($116_{FWD}$, $116_{AFT}$) disposed in intermeshing combination with said pinion (114), and
      a third reduction stage including forward and aft pinions ($118_{FWD}$, $118_{AFT}$) mounted in rotatable combination with said forward and aft gears ($116_{FWD}$, $116_{AFT}$), respectively; and
   a central bull gear (108) disposed in intermeshing combination with said forward and aft pinions ($118_{FWD}$, $118_{AFT}$);
   said pinion (114), said forward gear ($116_{FWD}$), said forward pinion ($118_{FWD}$), and said central bull gear (108) in combination defining a forward split path for said split path transmission system, and said pinion (114), said aft gear ($116_{AFT}$), said aft pinion ($118_{AFT}$), and said central bull gear (108) in combination defining an aft split path for said split path transmission system;
   wherein said gears and pinions of one of said forward and aft split load paths (114, $116_{FWD}$, $118_{FWD}$, 108; 114, $116_{AFT}$, $118_{AFT}$, 108) are fabricated with an altered timing relationship to provide an intentional timing difference between said forward and aft split load paths (114, $116_{FWD}$, $118_{FWD}$, 108; 114, $116_{AFT}$, $118_{AFT}$, 108) such that the other split load path transmits all the torque over an input torque range of said split path transmission system;

said input torque range being quantified by identifying torque distribution curves for said forward and aft split load paths (114, 116$_{FWD}$, 118$_{FWD}$, 108; 114, 116$_{AFT}$, 118$_{AFT}$, 108), depicting said forward and aft torque distribution curves in a two-dimensional graphical format wherein an abscissa represents torque coupled into said gear train (106) and an ordinate represents torque transmitted through said forward and aft split load paths (114, 116$_{FWD}$, 118$_{FWD}$, 108; 114, 116$_{AFT}$, 118$_{AFT}$, 108), selecting a predefined operating point for said split path transmission system wherein equal torque splitting between said forward and aft split load paths (114, 116$_{FWD}$, 118$_{FWD}$, 108; 114, 116$_{AFT}$, 118$_{AFT}$, 108) is desired, analytically modifying said forward and aft torque distribution curves as required to pass through said predefined operating point, and identifying an interception point of the abscissa with the analytically modified torque distribution curve having a steeper slope to quantify said input torque range.

* * * * *